United States Patent
Shiu et al.

(10) Patent No.: US 7,187,708 B1
(45) Date of Patent: Mar. 6, 2007

(54) DATA BUFFER STRUCTURE FOR PHYSICAL AND TRANSPORT CHANNELS IN A CDMA SYSTEM

(75) Inventors: Da-Shan Shiu, San Jose, CA (US); Avneesh Agrawal, San Jose, CA (US)

(73) Assignee: Qualcomm Inc., San Diego, CA (US)

( * ) Notice: Subject to any disclaimer, the term of this patent is extended or adjusted under 35 U.S.C. 154(b) by 1114 days.

(21) Appl. No.: 09/678,645

(22) Filed: Oct. 3, 2000

(51) Int. Cl.
*H04B 1/69* (2006.01)

(52) U.S. Cl. .................. 375/148; 375/130; 375/135; 375/136; 375/146; 370/232; 341/81

(58) Field of Classification Search ............... 375/130, 375/135, 136, 140, 146, 147, 148; 341/81, 341/83, 82; 370/232; 714/702, 755
See application file for complete search history.

(56) References Cited

U.S. PATENT DOCUMENTS

| | | | |
|---|---|---|---|
| 5,241,541 A * | 8/1993 | Farrell et al. ............... 370/438 |
| 5,710,784 A * | 1/1998 | Kindred et al. ............. 375/262 |
| 6,392,572 B1 * | 5/2002 | Shiu et al. .................... 341/81 |
| 6,493,815 B1 * | 12/2002 | Kim et al. .................. 711/217 |
| 6,510,137 B1 * | 1/2003 | Belaiche ..................... 370/232 |
| 6,668,343 B1 * | 12/2003 | Kim et al. .................. 714/702 |

FOREIGN PATENT DOCUMENTS

| | | |
|---|---|---|
| EP | 0998052 | 5/2000 |
| WO | 9610873 | 4/1996 |

* cited by examiner

Primary Examiner—Shuwang Liu
(74) Attorney, Agent, or Firm—Philip R Wadsworth; Charles D. Brown; Kenyon S. Jenckes

(57) ABSTRACT

A buffer structure for storing symbols received via a number of (e.g., physical or transport) channels. Each channel is associated with a particular time interval (e.g., a radio frame period or a transmission time interval (TTI)) over which the received symbols are processed (e.g., interleaved). The buffer structure includes a buffer and an address generator. The buffer is partitioned into a number of sections. One section is assigned to each channel being processed. Each section can be operated as a circular buffer. The address generator provides addresses for writing symbols to the assigned sections. If the buffer structure is used for the transport channels, the sections can be assigned to the transport channels based on the associated TTIs (e.g., in descending order of TTIs). For each coded composite transport channel (CCTrCH), the transport channels in the CCTrCH can be assigned to sections defined starting from a respective initial location (e.g., the top or bottom of the buffer) and continuing along a respective direction of the buffer (e.g., downward or upward).

7 Claims, 10 Drawing Sheets

DATA BUFFER STRUCTURE FOR PHYSICAL AND TRANSPORT CHANNELS IN A CDMA SYSTEM

BACKGROUND OF THE INVENTION

I. Field of the Invention

The present invention relates to data communication. More particularly, the present invention relates to a novel and improved data buffer structures for storing symbols received for multiple physical and transport channels in a CDMA system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard and incorporated herein by reference. The IS-95 CDMA systems are able to transmit voice data and (albeit not efficiently) packet data. A newer generation standard that can more efficiently transmit packet data is offered by a consortium named "3$^{rd}$ Generation Partnership Project" (3GPP) and embodied in a set of documents including Document Nos. 3G TS 25.211, 3G TS 25.212, 3G TS 25.213, 3G TS 25.214, and 3G TR 25.926, which are readily available to the public. The 3GPP standard is hereinafter referred to as the W-CDMA standard and incorporated herein by reference.

The W-CDMA standard defines a channel structure capable of supporting a number of users and designed for efficient transmission of packet data. In accordance with the W-CDMA standard, data to be transmitted is processed as one or more "transport" channels at a higher signaling layer. The transport channels support concurrent transmission of different types of services (e.g., voice, video, data, and so on). The transport channels are then mapped to one or more "physical" channels that are assigned to a user terminal for a communication (e.g., a call).

The W-CDMA standard allows for a great deal of flexibility in the processing of the transport channels. For example, data for a particular transport channel can be coded using a convolutional code, a Turbo code, or not coded at all. Also, the data can be interleaved over one of four different time intervals (i.e., 10 msec, 20 msec, 40 msec, or 80 msec) to provide temporal diversity against deleterious path effects (e.g., fading, multipaths, and so on). Different combinations of coding scheme and interleaving interval can be selected to provide improved performance for different types of services. For example, enhanced efficiency and performance may be obtained by processing packet data using Turbo code and a long interleaving interval, which may result in longer processing delays. In contrast, voice and video data may be processed using convolutional code and a short interleaving interval since long processing delays cannot be tolerated.

A user terminal in a W-CDMA system may receive multiple transmissions (i.e., multiple transport channels) concurrently via multiple physical channels. For costs consideration, it is highly desirable to design a user terminal capable of processing multiple physical and transport channels using a basic set of processing and storage elements. In particular, data buffer structures that can be used to efficiently store data received for multiple physical/transport channels, and to facilitate the processing of such data, are highly desirable.

SUMMARY OF THE INVENTION

The present invention provides data buffer structures that can be used to efficiently store symbols received for a number of physical and transport channels. Two buffers can be provided to store symbols received for the physical and transport channels. Each buffer can be partitioned into a number of sections and the sections can be assigned such that the symbols received for each physical or transport channel can be store to a respective assigned section. Each buffer can be partitioned and allocated such that (1) the received and stored symbols are not prematurely overwritten by newly received symbols, (2) the amount of fragmentation in the buffer is reduced or eliminated, and (3) the maintenance and operation of the buffer are simplified.

The design and operation of each buffer can exploit various known characteristics of the physical and transport channels. For the physical channel buffer, the spreading factor of each physical channel and thus the size of each radio frame can be determined and used to partition the buffer into appropriately sized sections. For the transport channel buffer, the transport format (e.g., the transmission time interval (TTI) and the data rate) of each "traffic" (defined below) on each transport channel can be determined. Sections of the buffer can be assigned to the transport channels (e.g., in descending order of the TTIs), and sufficient amount of storage can be allocated in each section based on the determined data rate. Also, since the transport channels for a particular coded composite transport channel (CCTrCH) are aligned (in time) at the radio frame boundaries, the buffer can be partitioned and allocated at these boundaries.

An aspect of the invention provides a buffer structure for storing symbols received via a number of (e.g., physical or transport) channels. Each channel is associated with a particular time interval (e.g., a radio frame period or a TTI) over which the received symbols are processed (e.g., interleaved). The buffer structure includes a buffer and an address generator. The buffer is partitioned into a number of sections. One section is assigned to each channel being processed. The address generator provides addresses for writing symbols to the assigned sections. The buffer structure can be advantageously used in a receiver unit in a W-CDMA system.

If the buffer structure is used for the transport channels, the sections can be assigned to the transport channels based on the associated TTIs (e.g., in descending order of TTIs). If the transport channels are for one CCTrCH, the buffer can be partitioned starting from an initial location (e.g., the top of the buffer) and the sections can be defined along one direction of the buffer (e.g., downward). If the transport channels are for two CCTrCHs, the transport channels for the first CCTrCH can be assigned to sections defined starting from a first initial location (e.g., the top) and continuing along a first direction of the buffer (e.g., downward), and the transport channels for the second CCTrCH can be assigned to sections defined starting from a second initial location (e.g., the bottom) and continuing along an opposite direction of the buffer (e.g., upward).

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
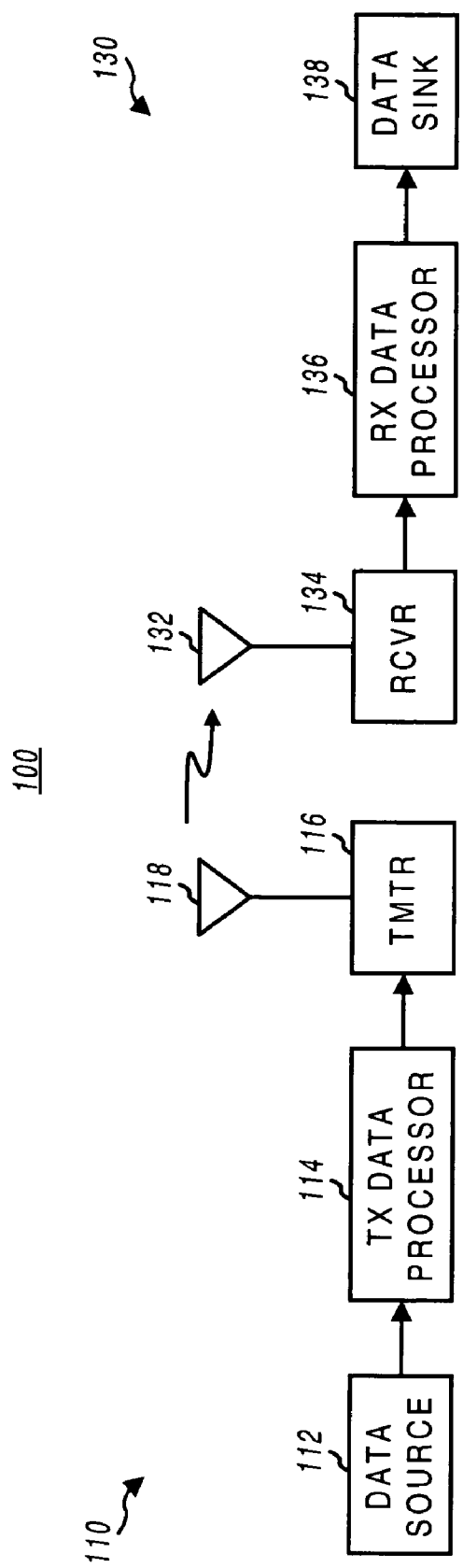
FIG. 1 is a simplified block diagram of a communication system that can implement the invention.

FIG. 1 is a simplified block diagram of a communication system 100 that can implement the invention. In a specific embodiment, communication system 100 is a CDMA system that conforms to the W-CDMA standard. At a transmitter unit 110, data is sent, typically in blocks, from a data source 112 to a transmit (TX) data processor 114 that formats, codes, and processes the data to generate one or more analog signals. The analog signals are then provided to a transmitter (TMTR) 116 that (quadrature) modulates, filters, amplifies, and upconverts the signal(s) to generate a modulated signal. The modulated signal is then transmitted via one or more antennas 118 (only one is shown in FIG. 1) to one or more receiver units.

At a receiver unit 130, the transmitted signal is received by one or more antennas 132 (again, only one is shown) and provided to a receiver (RCVR) 134. Within receiver 134, the received signal(s) are amplified, filtered, downconverted, (quadrature) demodulated, and digitized to generate samples. The samples are then processed and decoded by a receive (RX) data processor 136 to recover the transmitted data. The processing and decoding at receiver unit 130 are performed in a manner complementary to the processing and coding performed at transmitter unit 110. The recovered data is then provided to a data sink 138.

The signal processing described above supports transmissions of voice, video, packet data, messaging, and other types of communication in one direction. A bi-directional communication system supports two-way data transmission. However, the signal processing for the other direction is not shown in FIG. 1 for simplicity.

Figure 2A:
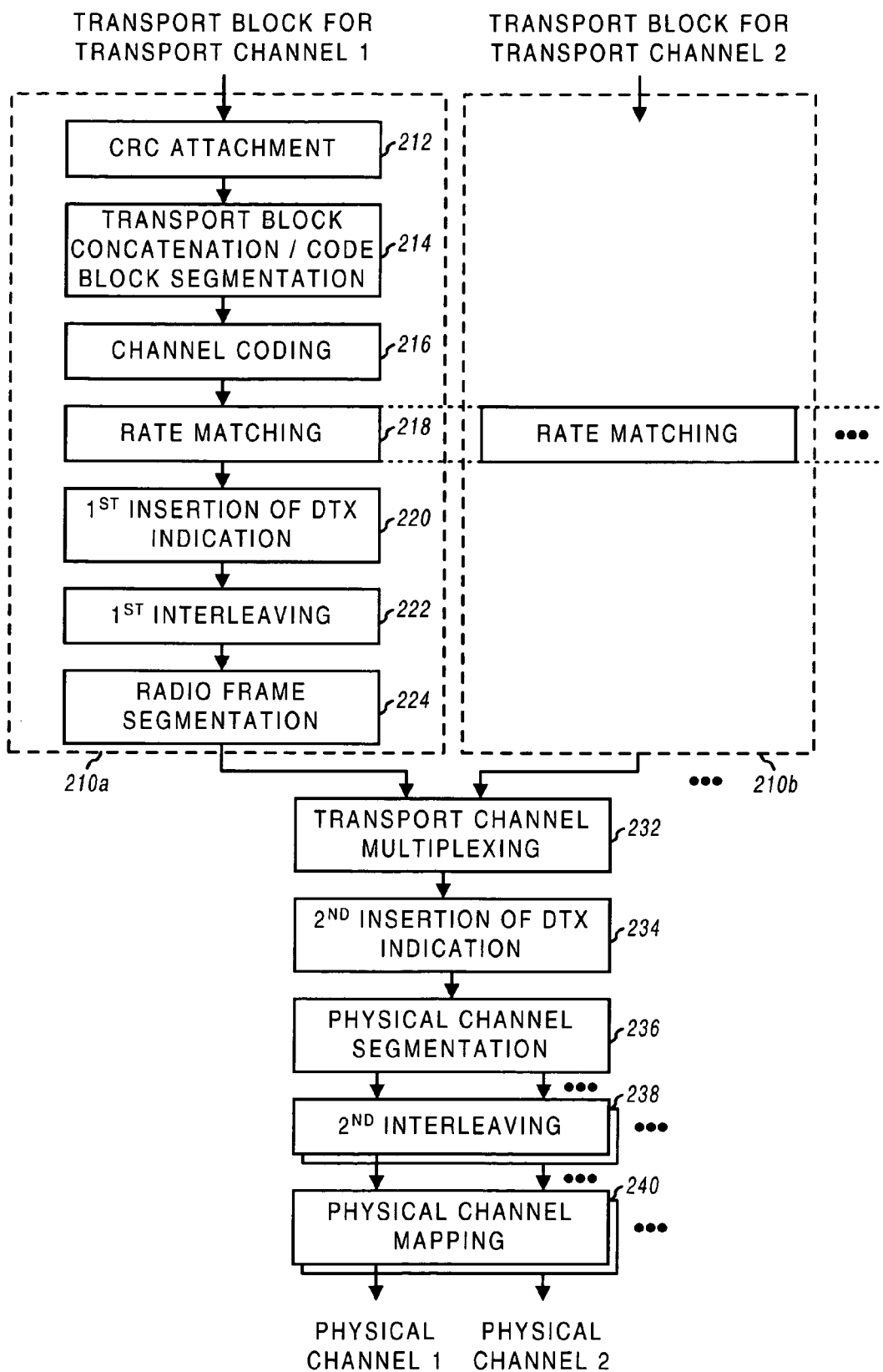
FIGS. 2A and 2B are diagrams of the signal processing at a transmitter unit and a receiver unit, respectively, for a downlink data transmission in accordance with the W-CDMA standard.

FIG. 2A is a diagram of the signal processing at transmitter unit 110 for a downlink data transmission in accordance with the W-CDMA standard. The downlink refers to transmission from a base station to a user terminal (or user equipment (UE)), and the uplink refers to transmission from the user terminal to the base station. The signal processing shown in FIG. 2A is generally performed by transmit data processor 114 in FIG. 1. The upper signaling layers of the W-CDMA system support concurrent transmission of a number of transport channels, with each transport channel capable of carrying data for a particular communication (e.g., voice, video, data, and so on). The data for each transport channel is provided, in blocks that are also referred to as transport blocks, to a respective transport channel processing section 210.

Within transport channel processing section 210, each transport block is used to calculate cyclic redundancy check (CRC) bits, in block 212. The CRC bits are attached to the transport block and used at the receiver unit for error detection. A number of CRC coded blocks are then serially concatenated together, in block 214. If the total number of bits after concatenation is greater than the maximum size of a code block, the bits are segmented into a number of (equal-sized) code blocks. Each code block is then coded with a particular coding scheme (e.g., a convolutional code, a Turbo code) or not coded at all, in block 216.

Rate matching is then performed on the code bits, in block 218. Rate matching is performed in accordance with a rate-matching attribute assigned by higher signaling layers. On the uplink, bits are repeated or punctured (i.e., deleted) such that the number of bits to be transmitted matches the number of bits available. On the downlink, unused bit positions are filled with discontinuous transmission (DTX) bits, in block 220. The DTX bits indicate when a transmission should be turned off and are not actually transmitted.

The bits are then interleaved in accordance with a particular interleaving scheme to provide time diversity, in block 222. In accordance with the W-CDMA standard, the time interval over which interleaving is performed can be selected from a set of possible time intervals (i.e., 10 msec, 20 msec, 40 msec, or 80 msec). The interleaving time interval is also referred to as a transmission time interval (TTI). The TTI is an attribute associated with each transport channel and, in accordance with the W-CDMA standard, does not change for the duration of a communication session. As used herein, a "traffic" comprises the bits within one TTI for a particular transport channel.

When the selected TTI is longer than 10 msec, the traffic is segmented and mapped onto consecutive transport channel radio frames, in block 224. Each transport channel radio frame corresponds to a transmission over a (10 msec) radio frame period. In accordance with the W-CDMA standard, a traffic may be interleaved over 1, 2, 4, or 8 radio frame periods.

The radio frames from all active transport channel processing sections 210 are then serially multiplexed into a coded composite transport channel (CCTrCH), in block 232. DTX bits may then be inserted to the multiplexed radio frames such that the number of bits to be transmitted matches the number of bits available on the physical channel (s) used for the data transmission, in block 234. If more than one physical channel is used, the bits are segmented among the physical channels, in block 236. A particular physical channel can carry transport channels having different TTIs. The bits in each radio frame period for each physical channel are then interleaved to provide additional time diversity, at block 238. The interleaved physical channel radio frames are then mapped to their respective physical channels, at block 240. The subsequent signal processing to generate a modulated signal suitable for transmission to a user terminal is known in the art and not described herein.

Figure 2B:
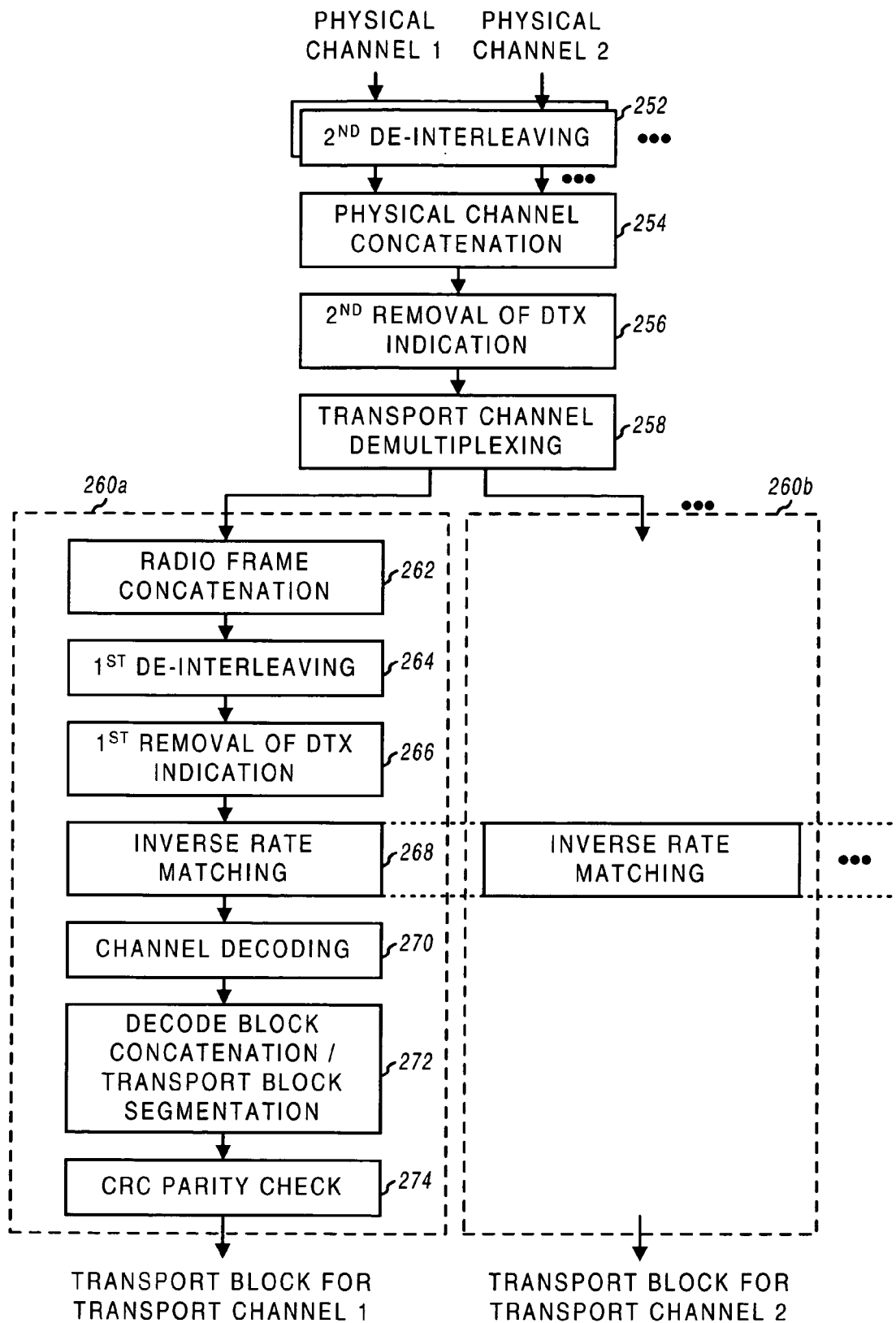

FIG. 2B is a diagram of the signal processing at receiver unit 130 for a downlink data transmission in accordance with the W-CDMA standard. The signal processing shown in FIG. 2B is complementary to that shown in FIG. 2A, and is generally performed by receive data processor 136 in FIG. 1. Initially, the modulated signal is received, conditioned, digitized, and processed to provide symbols for to each physical channel used for the data transmission. Each symbol has a particular resolution (e.g., 4-bit) and corresponds to a transmitted bit. The symbols in each radio frame period for each physical channel are de-interleaved, in block 252, and the de-interleaved symbols from all physical channels are concatenated, in block 254. For a downlink transmission, non-transmitted bits are detected and removed, in block 256. The symbols are then demultiplexed into various transport channels, in block 258. The radio frames for each transport channel are then provided to a respective transport channel processing section 260.

Within transport channel processing section 260, the transport channel radio frames are concatenated into traffics, in block 262. Each traffic includes one or more transport channel radio frames and corresponds to a particular TTI used at the transmitter unit. The symbols within each traffic are de-interleaved, in block 264, and non-transmitted symbols are removed, in block 266. Inverse rate matching is then performed to accumulate repeated symbols and insert "don't cares" for punctured symbols, in block 268. Each coded block in the traffic is then decoded, in block 270. The decoded blocks are then concatenated and segmented into their respective transport blocks, in block 272. Each transport block is then checked for error using the CRC bits, in block 274.

In accordance with the W-CDMA standard, a number of physical channels can be used to send data to a particular user terminal. Each physical channel is covered with an orthogonal variable spreading factor (OVSF) code having a particular spreading factor (ranging from 4 to 512 for the downlink). The OVSF code for each physical channel is determined (by the network) at the start of a communication session and typically does not change during the session, except for a few cases: (1) if the physical channel is of the physical downlink shared channel (PDSCH) type, or (2) the receiver unit 130 is hand off to another cell and the other cell assigns another possibly different OVSF code to the physical channel. A smaller spreading factor (e.g., 4) corresponds to a shorter code length and is used for a higher data rate, and a larger spreading factor (e.g., 512) corresponds to a longer code length and is used for a lower data rate.

In accordance with the W-CDMA standard, for any arbitrary (10 msec) radio frame interval, the total number of bits for all physical channels is constrained to be less than or equal to a particular specified limit, $C_P$, which is typically determined in part by the capability of the user equipment (UE). This specification can be expressed as:

$$\sum_{i=1}^{K_P} N_{Pi} \leq C_P, \quad \text{Eq (1)}$$

where $N_{Pi}$ is the number of bit for physical channel i for a particular radio frame interval, $K_P$ is the total number of physical channels, and $C_P$ is the specified limit.

At the receiver unit, the symbols received via each physical channel are processed (e.g., despread and decovered) and further de-interleaved over each radio frame period. The de-interleaving is achieved with the use of a buffer. The de-interleaved symbols for all physical channels associated with each CCTrCH are concatenated and then demultiplexed into respective transport channels.

For each radio frame period, if the symbols received for the physical channels for the current radio frame period cannot be provided to the subsequent processing section before symbols for the next radio frame period are received, the received symbols for the current radio frame period need to be temporarily buffered. The new symbols for the next radio frame period can be stored to an available portion of a buffer.

If only one physical channel is being processed, a circular buffer of size as small as $(1+\epsilon)K_S$ can be used to store the symbols for the physical channel, where $K_S$ is the number of symbols expected to be received for the physical channel over each radio frame period and $\epsilon$ (in unit of radio frame period) is the time it takes to read out the previously received and stored symbols. The subscript "S" denotes that a spreading factor of S is used. For this circular buffer, the first physical channel radio frame can be stored to locations 0 through $(K_S-1)$, the next physical channel radio frame can be stored to locations $K_S$ through $(2K_S-1) \bmod (1+\epsilon)K_S$, and so on. As a specific example, if $K_S=100$ and $\epsilon=0.03$, then the first radio frame can be stored to locations 0 through 99, the second radio frame can be stored to locations 100 through 96 (the buffer is wrapped around to 0 after reaching 102), the third radio frame can be stored to locations 97 through 93, and so on. Thus, the first three symbols of the second radio frame are written to locations 100 through 102 while the symbols for the first radio frame are provided to the next processing section. The operation of the buffer in this manner avoids premature overwriting of the stored symbols.

The W-CDMA standard allows for the concurrent reception of multiple physical channel, as long as the total number of bits for all physical channels in each radio frame period is within the specified limit, $C_P$, as expressed in equation (1). For example, if a receiver unit is capable of supporting a single physical channel with a spreading factor of 4, then it is also capable of supporting (1) two physical channels with a spreading factor of 8, or (2) four physical channels with a spreading factor of 16, or (3) one physical channel with a spreading factor of 8 and two physical channels with a spreading factor of 16, and so on.

If multiple physical channels are received and their symbols are written to contiguous sections of the buffer, then the symbols received in the current radio frame period may be prematurely overwritten by symbols for the next radio frame period. As an example, two physical channels can be concurrently received, each with a spreading factor of 2S and carrying half the total number of symbols (i.e., $K_{2S}=K_S/2$). If the symbols for these two physical channels are stored to contiguous sections of the buffer, then the symbols for the first physical channel can be stored to locations 0 through ($K_{2S}$–1) (e.g., 0 through 49, using $K_S$=100, $K_{2S}$=50, and ε=0.03) and the symbols for the second physical channel can be stored to locations $K_{2S}$ through (2$K_{2S}$–1) (e.g., 50 through 99). For the next radio frame period, the symbols for the first physical channel can be stored to locations 2$K_{2S}$ through (3$K_{2S}$–1) mod (1+ε)$K_S$ (e.g., 100 through 46) and the symbols for the second physical channel can be stored to locations 3$K_{2S}$ mod (1+ε)$K_S$ through (4$K_{2S}$–1) mod (1+ε)$K_S$ (e.g., 47 through 96). Using this buffering scheme, the stored symbols for the first physical channel would be prematurely overwritten by the symbols for the second physical channel (e.g., symbols stored in locations 47 through 49 would be prematurely overwritten).

In accordance with an aspect of the invention, a buffer is provided to store the symbols received for all physical channels. Various characteristics of the physical channels can be exploit in the design and operation of the buffer. The spreading factor of each physical channel can be determined and used to partition the buffer into appropriately sized sections. The sections are then allocated to the physical channels such that the symbols received for each physical channel can be stored to a respective section of the buffer. The sections can be defined and assigned such that (1) symbols received in the current radio frame period are not prematurely overwritten, (2) the amount of fragmentation in the buffer is reduced or eliminated, and (3) the maintenance and operation of the buffer are simplified.

Figure 3:
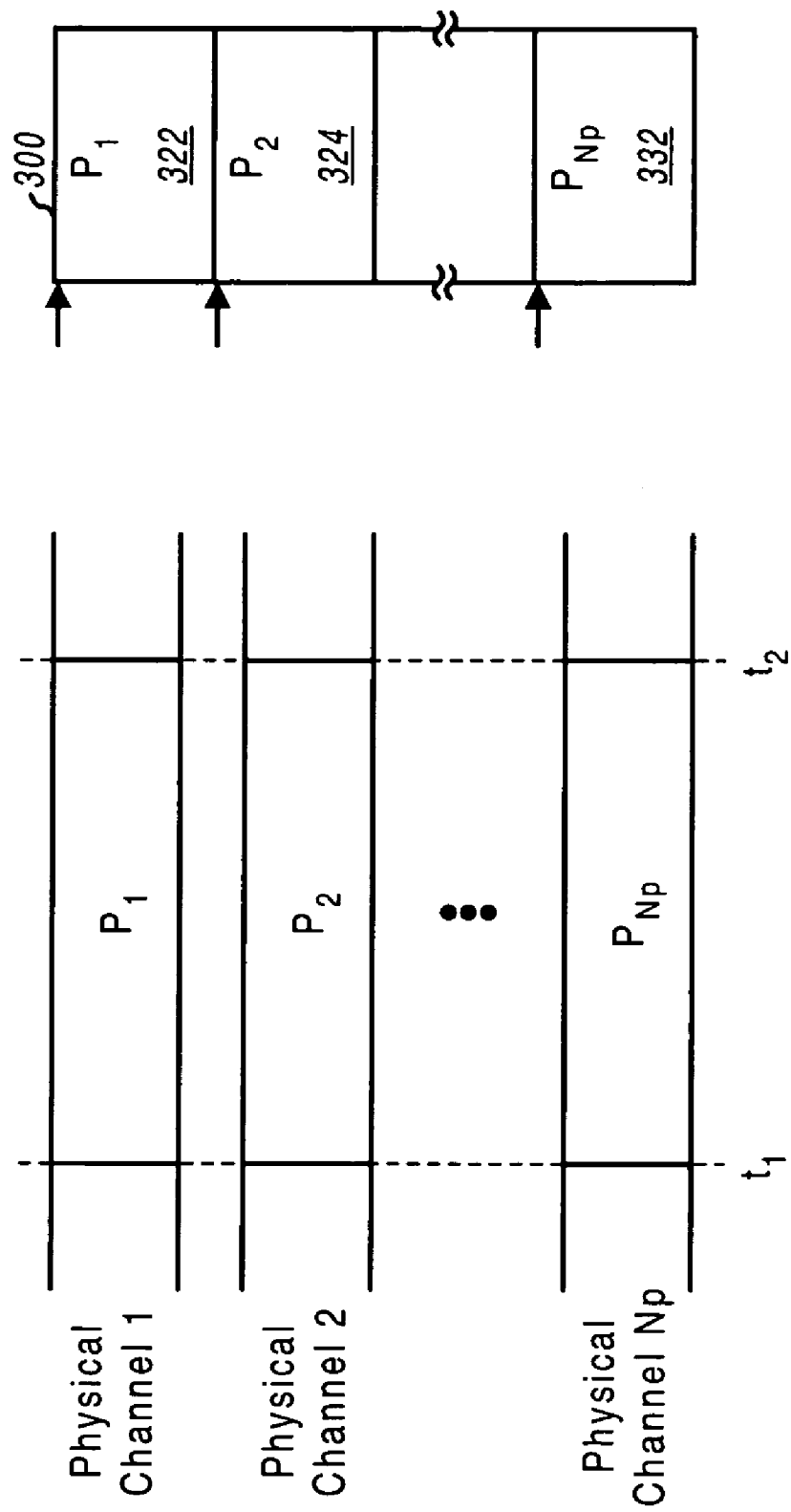
FIG. 3 is a diagram illustrating the storage of symbols received from multiple physical channels into a buffer, in accordance with an embodiment of the invention.

FIG. 3 is a diagram illustrating the storage of symbols received for multiple physical channels into a buffer 300, in accordance with an embodiment of the invention. In this embodiment, the physical channels are assigned respective sections of buffer 300. Each section is appropriately sized based on the size of the physical channel radio frame expected to be received and stored to the section.

As shown in FIG. 3, $N_P$ physical channels are being received. Initially, prior to each radio frame period, the spreading factors of the physical channels are determined and used to compute the sizes of the radio frames expected to be received in the next radio frame period. Based on the determined radio frame sizes, buffer 300 can be appropriately partitioned and allocated to the physical channels.

The spreading factors for most physical channels are negotiated at the start of the session and typically do not change from one radio frame to the next. Thus, sections of the buffer can be allocated for these physical channel based on the determined spreading factors. An exception is the PDSCH whose spreading factor can change during a communication and is selected from among a set of possible spreading factors defined as a function of the transport format combination set (TFCS). Nevertheless, the lowest spreading factor for a PDSCH can be considered constant throughout the duration of a connection. In an embodiment, storage is allocated to the PDSCH to accommodate the smallest possible spreading factor. For example, if a PDSCH can change its spreading factor among the set {64, 128, and 256}, then sufficient space is allocated for the PDSCH by assuming a spreading factor of 64.

In the example shown in FIG. 3, buffer 300 is partitioned and allocated based on the physical channel number and size. In this simple scheme, section 322 at the top of buffer 300 is allocated to physical channel 1 and is dimensioned with a size of (1+ε)$K_{S_1}$, where $K_{S_1}$ is the number of symbols expected to be received for physical channel 1 in a radio frame period and ε is the time it takes to read out the stored physical channel radio frame. Similarly, section 324 in buffer 300 (defined below section 322) is allocated to physical channel 2 and is dimensioned with a size of (1+ε)$K_{S_2}$, where $K_{S_2}$ is the number of symbols expected to be received for physical channel 2. The process continues in similar manner for other physical channels. Finally, section 332 at the bottom of buffer 300 is allocated to physical channel $N_P$ and is dimensioned with a size of (1+ε)$K_{S_{N_p}}$, where $K_{S_{N_p}}$ is the number of symbols expected to be received for physical channel $N_P$.

As a specific example, two physical channels can be received, with each physical channel having a spreading factor of 2S (or higher). Buffer 300 can be implemented with a size of (1+ε)$K_S$ and partitioned into two equal-sized sections. Each section has a size of (1+δ)$K_{2S}$ and can be allocated to a respective physical channel. As another specific example, four physical channels can be received, with each physical channel having a spreading factor of 4S (or higher). Buffer 300 can be implemented with a size of (1+ε)$K_S$ and partitioned into four equal-sized sections. Each section has a size of (1+ε)$K_{4S}$ and can be allocated to a respective physical channel. As yet another specific example, three physical channels can be received, with one physical channel having a spreading factor of 2S and two physical channels having a spreading factor of 4S (or higher). Buffer 300 can be implemented with a size of (1+ε)$K_S$ and partitioned into one section of size (1+ε)$K_{2S}$ and two equal-sized sections of size (1+ε)$K_{4S}$. The larger section of size (1+ε)$K_{2S}$ can be allocated to the physical channel with the spreading factor of 2S, and the two smaller sections can be allocated to the two physical channels with the spreading factor of 4S.

The symbols can be written to the section in a permutated order and read out in a sequential order to achieve the second de-interleaving in block 252. Alternatively, the symbols can be written to the section in a sequential order and read out in a permutated order to achieve the second de-interleaving. For each section, a write pointer can be initialized to the top of the section and updated (e.g., decremented, if the symbols are written to the buffer in sequential order) as symbols are written to the section, as shown in FIG. 3. Alternatively, the write pointer can be initialized to the bottom of the section and incremented as symbols are sequentially written to the section. A read pointer can also be maintained for each section and used to identify the next symbol to be read from the section.

Each allocated section can be operated as a regular buffer (i.e., with a defined top and bottom of the buffer) or as a circular buffer. The per-physical channel circular buffer scheme may be effective if symbols are written to the buffer in a sequential order. Otherwise, the space to be allocated to each physical channel may need to be (1+ε)K, where ε≧1.

Buffer 300 can be partitioned in various manners. In an embodiment, the sections are defined starting from the top of buffer 300 and moving downward. However, any arbitrary start location can be selected, and the sections can also be defined along any direction (upward or downward, or both).

Buffer 300 can efficiently store symbols received for the physical channels. Regardless of the number of physical channels and their radio frame sizes, as long as the total number of symbols is constrained as expressed in equation (1), the storage of the received symbols can be achieved using a buffer of a particular size (e.g., (1+ε)$C_P$ where ε≧0).

Buffer 300 can be operated such that fragmentation is reduced or eliminated. In an embodiment, the sections are allocated to the physical channels such that contiguous space in the buffer is utilized. Whenever a physical channel has been dropped, it may be possible to "move up" one or more sections previously allocated for one or more physical channels, thereby releasing the space originally allocated for these physical channels. This would create a contiguous free area of the buffer, which can then be allocated to another physical channel with a smaller spreading factor.

For example, a buffer may be designed with the capability to store symbols for one physical channel with a spreading factor of 8. Three physical channels may be received, with each physical channel having a spreading factor of 32. The first, second, and third physical channels may be allocated three sections of the buffer defined from locations (0 to X−1), (X to 2X−1), and (2X to 3X−1), respectively. If the second physical channel is then dropped, the third physical channel can be moved from (2X to 3X−1) to (X to 2X−1), thereby freeing the space at (2X to 3X−1). A contiguous section of the buffer from (2X to 4X−1) can then be allocated to one physical channel with a spreading factor of 16, two physical channels with spreading factors of 32, and so on.

In another embodiment, the sections are allocated to the physical channels taking advantage of the fact that it is not necessary to maintain a single contiguous free area in the buffer. In particular, suppose that the buffer can be dimensioned with an overall size (K) capable of storing symbols from a number ($2^N$, where N is an integer 1, 2, . . . ) of physical channels, with each physical channel having a spreading factor SF=s. A physical channel with a spreading factor of s' is assigned a section starting at location $K_{s'} \cdot L$, where L is the smallest integer such that this section does not overlap with other sections already assigned to other physical channels. When de-fragmentation is performed, physical channels having larger spreading factors are re-assigned first. This can significantly reduce the number of reassignment during de-fragmentation.

For example, consider a buffer of size $K_8$. In accordance with the above embodiment, it is a valid configuration to have section 1~$K_{64}$ assigned to a physical channel of SF=64, ($K_{32}$+1)~2$K_{32}$ to a second physical channel of SF=32, and ($K_{16}$+1)~2$K_{16}$ to a third physical channel of SF=16. When the second physical channel is dropped, the above embodiment prevents the unnecessary "moving up" of the third physical channel. For another example, suppose that sections 1~$K_{64}$, ($K_{64}$+1)~2$K_{64}$, (2$K_{64}$+1)~3$K_{64}$, and (4$K_{64}$+1)~6$K_{64}$ are assigned to a physical channels A, B, C, and D, respectively. The spreading factor of physical channels A, B, and C is 64 and the spreading factor of physical channel D is 32. When physical channel A is dropped, physical channels B, C, and D are "moved up" to sections 1~$K_{64}$, ($K_{64}$+1)~2$K_{64}$, (2$K_{64}$+1)~4$K_{64}$, respectively, thereby creating a free space enough for a physical channel of spreading factor 16.

Figure 4:
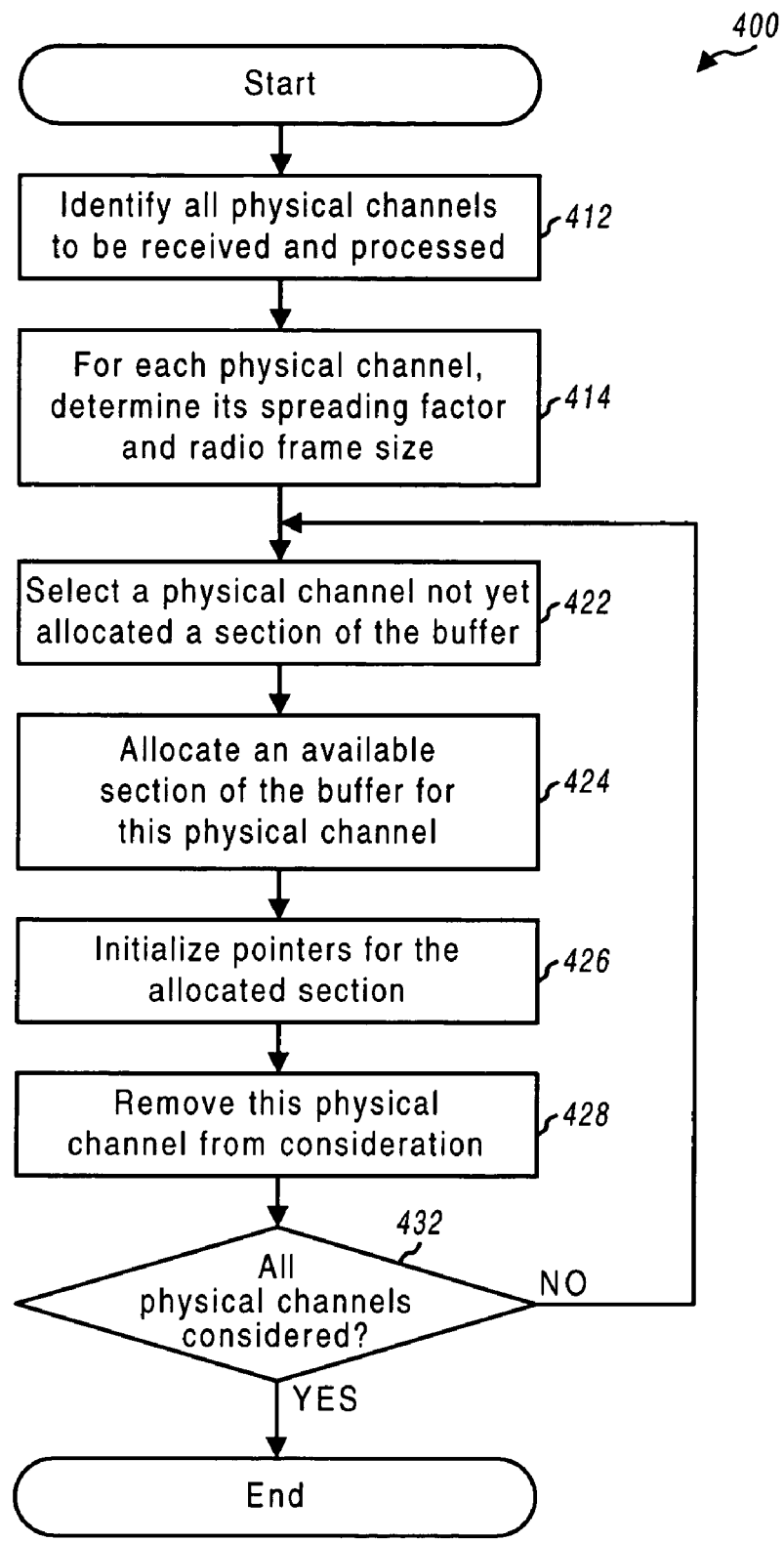
FIG. 4 is a flow diagram of a process to partition a buffer into a number of sections and to allocate the sections to multiple physical channels, in accordance with an embodiment of the invention.

FIG. 4 is a flow diagram of a process 400 to partition a buffer into a number of sections and to allocate the sections to multiple physical channels, in accordance with an embodiment of the invention. Process 400 can be executed at, or prior to, the start of each radio frame period (i.e., prior to reception of the physical channel radio frames).

Initially, at a particular designated time (e.g., prior to $t_1$ in FIG. 3), the physical channels to be received are identified, at step 412. The spreading factor and radio frame size of each physical channel are determined, at step 414. The physical channels are then assigned to respective sections of the buffer.

At step 422, a physical channel not yet allocated a section of the buffer is selected. A section of the buffer is then defined and assigned to the selected physical channel, at step 424. This section can be defined from the top of the buffer or from the end of the previously allocated section. The section is also defined with sufficient capacity to store the entire radio frame and (possibly) a portion of the next radio frame to be received for the physical channel, as described above. The write and read pointers for the allocated section are then initialized (e.g., to the top of the allocated section), at step 426. The physical channel is removed from consideration, at step 428.

A determination is then made whether all physical channels have been allocated sections of the buffer, at step 432. If all physical channels have been assigned sections of the buffer, the process terminates. Otherwise, the process returns to step 422 and another physical channel not yet allocated a section of the buffer is selected for assignment.

In accordance with the W-CDMA standard, a number of transport channels can be used to send data to a particular user terminal. Each transport channel can be associated with a particular TTI (i.e., 10, 20, 40, or 80 msec) over which its data is interleaved. The TTI for a particular transport channel is determined at the start of a communication session and typically does not change during the session. Different TTIs can be associated with different transport channels and used for different types of services. A shorter TTI provides less time diversity and can be used for services that cannot tolerate long processing delays (e.g., voice). In contrast, a longer TTI may provide improved time diversity and can be used for services that are less sensitive to delays (e.g., traffic data).

As noted above, any number of transport channels with any combination of TTIs can be used to send data. Also, the data rate of each transport channel can be variable and can change from one TTI to the next. In accordance with the W-CDMA standard, for any arbitrary (10 msec) radio frame interval, the total number of information bits for all transport channels is constrained to be less than or equal to a particular specified limit, $C_T$, which is typically determined in part by the capability of the user equipment. This specification can be expressed as:

$$\sum_{i=1}^{K_T} N_{Ti} \leq C_T, \qquad \text{Eq (2)}$$

where $N_{Ti}$ is the number of information bit for transport channel i for a particular radio frame interval, $K_T$ is the total number of transport channels, and $C_T$ is the specified limit.

Figure 5:
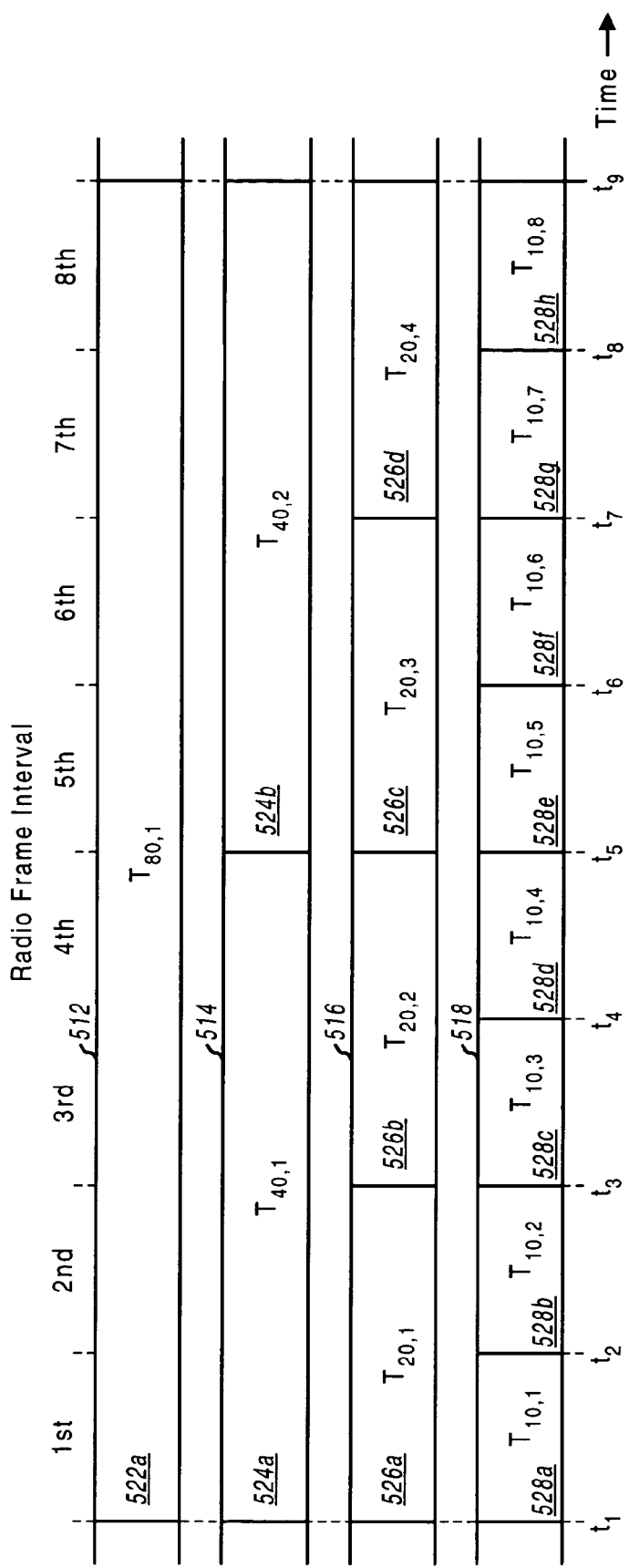
FIG. 5 is a diagram of an example data transmission over multiple transport channels.

FIG. 5 is a diagram of an example data transmission over multiple transport channels for a particular CCTrCH. In this specific example, the CCTrCH includes four transport channels that are associated with TTIs of 80 msec, 40 msec, 20 msec, and 10 msec, respectively. In accordance with the W-CDMA standard, since these transport channels are associated with the same CCTrCH, they are aligned in time (e.g., at $t_1$, $t_2$, and so on).

For each transport channel, the data rate can vary from one traffic to the next. Thus, each traffic can include any number of information bits, subject to the constraint expressed in equation (2). For example, traffic 524b in transport channel 514 may include more information bits than traffic 524a. Because of the constraint given by equation (2), the total number of information bits for each radio frame interval is limited to the specified value, $C_T$. Thus, if the transport channels are transmitting at the specified limit, $C_T$, and the data rate for any transport channel increases, then the data rate on one or more other transport channels needs to decrease accordingly. For example, for the fifth radio frame interval, if the data rate of traffic 524b increases, then the data rate on either traffic 526c or 528e, or both, is decreased accordingly to maintain equation (2).

The allowance for adjustment of the data rate from one traffic to the next provides enhanced flexibility. For example, information bits can be dynamically allocated among the transport channels (e.g., based on actual requirements). However, the flexible allocation of information bits among transport channels makes the design of a buffer to store the received symbols challenging.

A number of buffer designs can be used to store symbols received via a number of transport channels. In one simple buffer design, one buffer can be assigned to, and used to store the symbols received from, each transport channel. Since each transport channel can (theoretically) carry data up to the specified limit, $C_T$, each buffer can be designed with the capacity to store up to $8(1+\delta)C$ symbols, where 8 correspond to the maximum TTI, and $\delta$ is the time it takes to read out the previously received and stored traffic. Moreover, since a number of transport channels may be transmitted concurrently, a number of buffers can be provided, one for each transport channel. This simple buffer design requires more storage capacity than actually needed by equation (2) and results in an inefficient use of the available resources.

In accordance with another aspect of the invention, a buffer is provided to store the symbols received for all transport channels. The buffer is partitioned and allocated such that the symbols received for each transport channel can be store to a respective section of the buffer. The sections are defined and allocated such that (1) the received and stored traffics are not prematurely overwritten by newly received traffics, (2) the amount of fragmentation in the buffer is reduced or eliminated, and (3) the maintenance and operation of the buffer are simplified.

Various characteristics of the transport channels can be exploit in the design and operation of the buffer. First, since the transport channels for a particular CCTrCH are aligned (in time) at the radio frame boundaries, the buffer can be partitioned and allocated at these boundaries. Second, the transport format (e.g., the TTI and data rate) of each traffic on each transport channel can be determined prior to reception of the traffic. The TTI information can be used to assign sections of the buffer to the transport channels, and the data rate information can be used to allocate sufficient amount of storage to each section.

Figure 6:
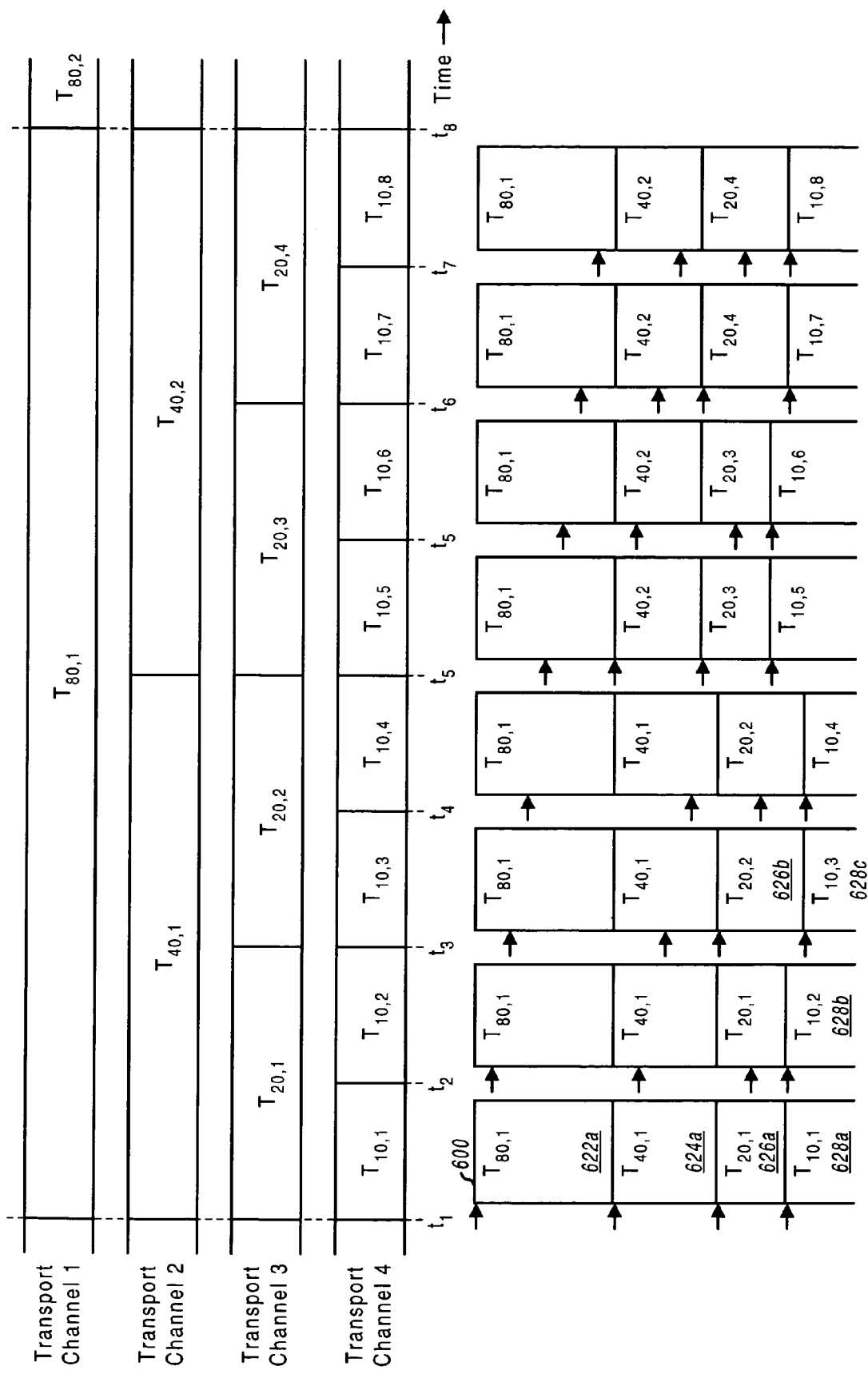
FIGS. 6 and 7 are diagrams illustrating the storage of symbols received from multiple transport channels into a buffer in accordance with two embodiments of the invention.

FIG. 6 is a diagram illustrating the storage of symbols received from multiple transport channels into a buffer 600, in accordance with an embodiment of the invention. In this embodiment, the transport channels are assigned respective sections of buffer 600 based on, and in descending order of, their TTIs. Also, each section is appropriately sized based on the size of the traffic expected to be received and stored to the section.

In an embodiment, for the W-CDMA system, the symbols can be stored to the allocated section such that the inverse rate matching in block 268 can be achieved "in-place". In this embodiment, if symbol repetition is performed at the transmitter unit, the repeated symbols can be accumulated to their proper locations in the allocated section. In this manner, only one accumulated symbols is stored for each information bit, which may have been transmitted with multiple repeated bits. Alternatively, the symbols can be stored as they are received and the inverse rate matching can be performed on the symbols as they are retrieved from the buffer.

For clarity, the operation of buffer 600 is illustrated for the specific example shown in FIG. 5 in which four transport channels are received. Initially, prior to time $t_1$, the TTIs of the four transport channels can be determined to be 80, 40, 20, and 10 msec. The data rates of the traffics $T_{80,1}$, $T_{40,1}$, $T_{20,1}$, and $T_{10,1}$ to be received for these four transport channels can also be determined and the sizes of these traffics (in number of information and code tail symbols) can be computed as $N_{80,1}$, $N_{40,1}$, $N_{20,1}$, and $N_{10,1}$, respectively. Based on the determined traffic sizes, buffer 600 can be appropriately partitioned and allocated for the four traffics to be received starting at time $t_1$.

In an embodiment, buffer 600 is partitioned and assigned to the transport channels based on their TTIs. In the example shown in FIG. 6, the traffic $T_{80,1}$ associated with the longest TTI is assigned to a section 622a at the top of buffer 600. Sufficient space ($N_{80,1}$) is allocated in section 622a to store the entire traffic $T_{80,1}$. Additional space ($\delta \cdot N_{80,1}$) may also be allocated to store a portion of the next traffic $T_{80,2}$ while the current traffic $T_{80,1}$ is being processed. Thus, section 622a at the top of buffer 600, which is dimensioned with the capacity to store up to $(1+\delta)N_{80,1}$ symbols, is allocated to transport channel 1 and used to store the symbols for traffic $T_{80,1}$.

Similarly, prior to time $t_1$, a section 624a of buffer 600 is allocated for the traffic $T_{40,1}$ associated with the next longest TTI. Again, sufficient space ($N_{40,1}$) is allocated in section 624a for the entire traffic $T_{40,1}$ and additional space ($\delta \cdot N_{40,1}$) may also be allocated to store a portion of the next traffic $T_{40,2}$ while the current traffic $T_{40,1}$ is being processed. Thus, section 624a, which is defined below section 622a and dimensioned with the capacity to store up to $(1+\delta)N_{40,1}$ symbols, is allocated to transport channel 2 and used to store the symbols for traffic $T_{40,1}$.

The allocation of buffer 600 for other transport channels proceeds in similar manner. Specifically, a section 626a is allocated to transport channel 3 and used to store symbols for traffic $T_{20,1}$, which is associated with the next longest TTI. Section 626a is defined below section 624a and dimensioned with the capacity to store up to $(1+\delta)N_{20,1}$ symbols. The symbols for traffic $T_{10,1}$ on transport channel 4, which is associated with the shortest TTI, can be stored in a section 628a defined below section 626a.

Initially, at the start of the radio frame boundary, a write pointer (and a read pointer) for each traffic can be initialized to a particular start location (e.g., the top of the allocated section). As symbols for a particular traffic are received and written to the assigned section of buffer 600, the write pointer can be updated (e.g., decremented) accordingly. The symbols can be written to permuted locations of the section to achieve the first de-interleaving in block 264. In an embodiment, each allocated section of buffer 600 can be operated as a circular buffer.

At the next radio frame boundary, $t_2$, the traffic $T_{10,1}$ on transport channel 4 is completely received and processing on this traffic can be initiated. If traffic $T_{10,1}$ can be processed in a timely manner, the next traffic $T_{10,2}$ to be received on transport channel 4 can be stored beginning at the same start location as for traffic $T_{10,1}$ (as shown in FIG. 6, with the write pointer being re-initialized to the same start location as for traffic $T_{10,1}$). If a traffic (e.g., $T_{10,1}$) cannot be processed by the time the symbols for the next traffic (e.g., $T_{10,2}$) are received, then the symbols for the new traffic can be stored such that the symbols for the current traffic are not prematurely overwritten. For example, the symbols for the new traffic can be stored at the end of the section (e.g., $\delta \cdot K$) allocated for the transport channel.

In an embodiment, each allocated section is operated as a regular buffer (i.e., with a defined top and bottom). Alternatively, each section may be operated as a circular buffer, although additional space may need to be allocated to ensure proper operation of the circular buffer such that symbols for the current traffic are not overwritten before they can be processed.

At the next radio frame boundary, $t_3$, the traffic $T_{20,1}$ from transport channel 3 and the traffic $T_{10,2}$ from transport channel 4 are completely received and processing on these traffics can be initiated. A determination can be made as to the size of the next traffic $T_{20,2}$ to be received on transport channel 3, and a section 626b of buffer 600 of appropriate size $(1+\delta)N_{20,2}$ is allocated for this traffic. The next section 628c of buffer 600 can be allocated for the traffic $T_{10,3}$ to be received on transport channel 4. The symbols for the new traffics $T_{20,2}$ and $T_{10,3}$ can be stored to their respective allocated sections 626b and 628c (again, either from the start of the section or from the end of the previously received traffic $T_{20,1}$ and $T_{10,2}$, depending on whether the processing on the previously received traffics can be completed in a timely manner).

As can be seen in FIG. 6, by allocating sections of buffer 600 in descending order of the TTIs of the transport channels and by assigning sections closer to the top of buffer 600 to the transport channels associated with longer TTIs, buffer fragmentation is reduced or eliminated. With the above-described allocation scheme, if the section assigned to a particular transport channel needs to change in size, this change occurs at a radio frame boundary where new traffics will also be received for other transport channels associated with the same and shorter TTIs. Thus, buffer 600 can be re-partitioned for the new traffics to be received on these transport channels, without affecting the section(s) that have already been allocated to other transport channels associated with longer TTIs, since these sections are located above and are not affected by the re-partition.

For the example shown in FIG. 6, if the data rate of transport channel 3 changes at radio frame boundary $t_3$, then new traffics will be received for transport channels 3 and 4. Buffer 600 can thus be re-partitioned for these transport channels without affecting the allocations for transport channels 1 and 2. Similarly, if the data rate of transport channel 2 changes at radio frame boundary $t_5$, then new traffics will be received for transport channels 2, 3, and 4. Buffer 600 can then be re-partitioned for these transport channels without affecting the allocation for transport channel 1 . And if the data rate of transport channel 1 changes at radio frame boundary $t_9$, then new traffics will be received for all four transport channels, and buffer 600 can be re-partitioned for all four transport channels.

For simplicity, sections of buffer 600 are defined starting at the "top" of the buffer. However, any arbitrary starting point can be selected (e.g., the bottom, the middle, or some other location of buffer 600). From the selected starting point, sections can be defined along a particular direction of the buffer (either upward or downward). The write and read pointers can be appropriately initialized and maintained to implement the desired buffer structure.

In accordance with the W-CDMA standard, the transport channels for a particular CCTrCH are aligned in time, as shown in FIG. 6. However, the W-CDMA does not define a specific timing relationship between multiple CCTrCHs transmitted concurrently. The transport channels for these CCTrCHs may not be aligned (in time) with each other and can be viewed as being asynchronous. In accordance with the W-CDMA standard, the 80 msec TTI boundaries of transport channels in two CCTrCHs can be as far apart as 40 msec. With this maximum time offset, allocation of the buffer in descending order of TTIs for the transport channels in all CCTrCHs may not be possible.

Even for multiple concurrently transmitted CCTrCHs, the W-CDMA standard still specifies that the total number of information bits for all transport channels over any radio frame interval is less than or equal to the specified limit, $C_T$, as expressed in equation (2). However, the W-CDMA standard does not specify a particular maximum number of bits that can be transmitted on each CCTrCH. The specified limit, $C_T$, can be used to design and operate a buffer to efficiently store symbols received via multiple CCTrCHs.

Figure 7:
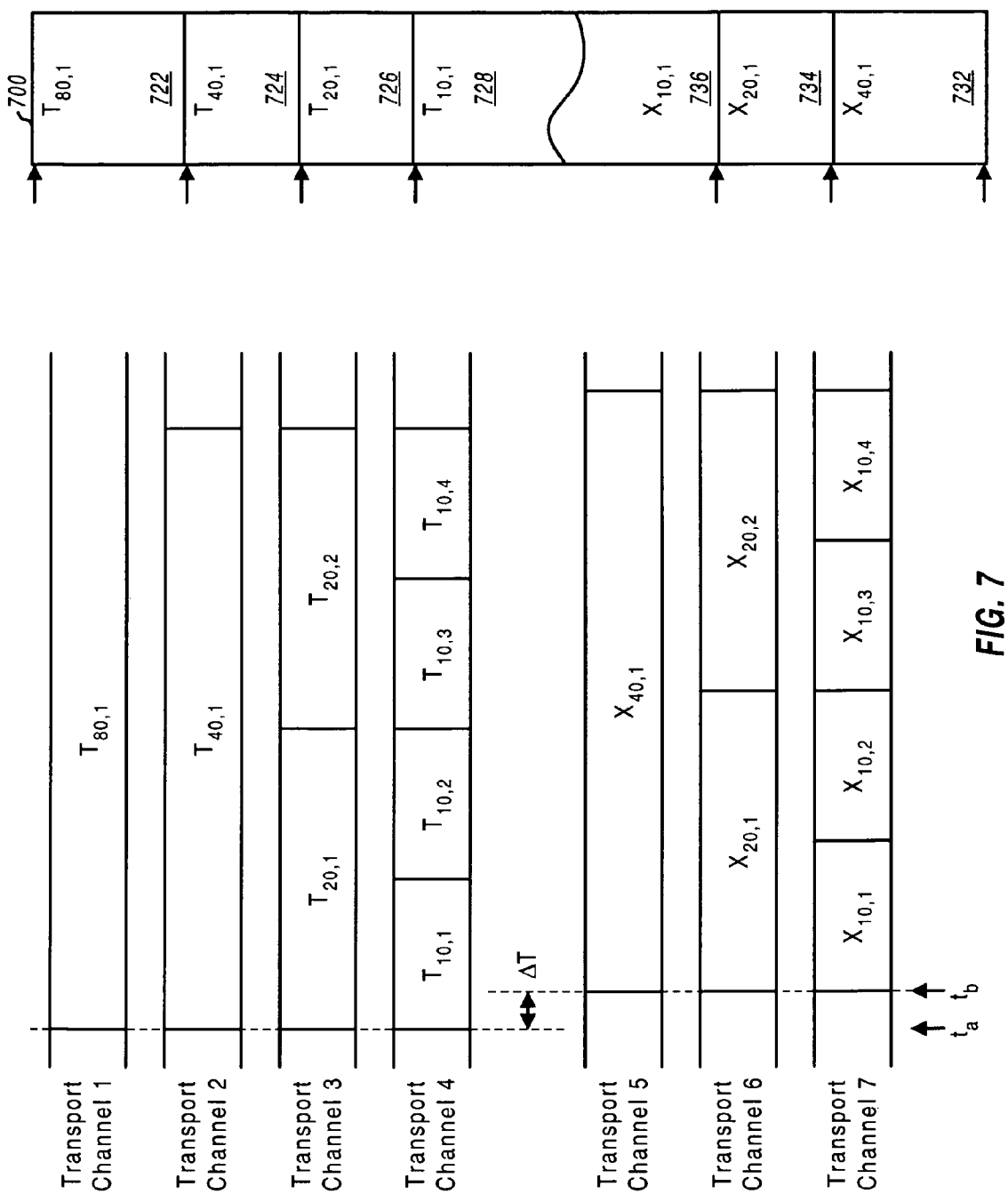

FIG. 7 is a diagram illustrating the storage of symbols received from multiple transport channels associated with two CCTrCHs into a buffer 700, in accordance with an embodiment of the invention. Similar to buffer 600 in FIG. 6, the transport channels are assigned (contiguous) sections of buffer 700 based on, and in descending order of, their TTIs. However, since the CCTrCHs may not be aligned in time (instead, having a time offset of $\Delta T$, as shown in FIG. 7), the transport channels for these CCTrCHs can be assigned to respective sections of buffer 700 starting from opposite ends of buffer 700. Each section is appropriately sized based on the size of the traffic expected to be received and stored to the section.

For clarity, the operation of buffer 700 is illustrated for the specific example shown in FIG. 7 in which two CCTrCHs are received. The first CCTrCH includes four transport channels 1 through 4 and the second CCTrCH includes three transport channels 5 through 7. Buffer 700 can be partitioned and allocated to the transport channels of each CCTrCH at or near the radio frame boundaries for the CCTrCH.

Prior to time $t_a$, the TTIs of the four transport channels associated with the first CCTrCH can be determined to be 80, 40, 20, and 10 msec. Sections 722, 724, 726, and 728 defined from one end (e.g., the top) of buffer 700 can then be allocated for these transport channels, as described above with respect to FIG. 6. Similarly, prior to time $t_b$, the TTIs of the three transport channels associated with the second CCTrCH can be determined to be 40, 20, and 10 msec. Sections 732, 734, and 736 defined from the other end (e.g., the bottom) of buffer 700 can similarly be allocated for these transport channels.

In the example shown in FIG. 7, the traffic $T_{80,1}$ associated with the longest TTI in the first CCTrCH is assigned to section 722 at the top of buffer 700, the traffic $T_{40,1}$ associated with the next longest TTI for this CCTrCH is assigned to section 724 defined below section 722, the traffic $T_{20,1}$ associated with the next longest TTI for this CCTrCH is assigned to section 726 defined below section 724, and the traffic $T_{10,1}$ associated with the shortest TTI for this CCTrCH is assigned to section 728 defined below section 726.

In a corresponding manner, the traffic $X_{40,1}$ associated with the longest TTI for the second CCTrCH is assigned to section 732 at the bottom of buffer 700, the traffic $X_{20,1}$ associated with the next longest TTI for this CCTrCH is assigned to section 734 defined above section 732, and the traffic $X_{10,1}$ associated with the shortest TTI for this CCTrCH is assigned to section 736 defined above section 734.

For sections 722, 724, 726, and 728 defined from the top of buffer 700 and allocated to the transport channels in the first CCTrCH, the write pointers can be initialized to the top of the sections and decremented as symbols are written to the sections. In a corresponding manner, for sections 732, 734, and 736 defined from the bottom of buffer 700 and allocated to the transport channels in the second CCTrCH, the write pointers can be initialized to the bottom of the sections and incremented as symbols are written to the sections. Again, the symbols can be written to, or read from, the sections in permutated order to achieve the first de-interleaving in block 264.

Again, the "top" and "bottom" of buffer 700 can be selected based on any arbitrary starting point. From the selected starting point, sections for the first CCTrCH can be defined along one direction of the buffer (either upward or downward) and sections for the second CCTrCH can be defined along the opposite direction of the buffer (downward or upward). The write and read pointers can be appropriately initialized and maintained to implement the desired buffer structure.

If more than two CCTrCHs are received and have time offsets greater than the shortest TTI, then multiple buffers can be provided to store symbols received for transport channels associated with these CCTrCHs. Each buffer can be used to support two CCTrCHs. Alternatively, the buffer can be divided into multiple partitions, with each partition used to support two CCTrCHs.

The buffers described above can also be advantageously used to store data associated with different processing delays. Data associated with the longest processing delays can be stored to one section of the buffer. Other data associated with decreasingly shorter processing delays can be stored to other sections of the buffer. The sections can be defined and assigned based on the processing delays. The buffers described herein reduce or eliminate fragmentation and are (relatively) simple to manage.

Figure 8:
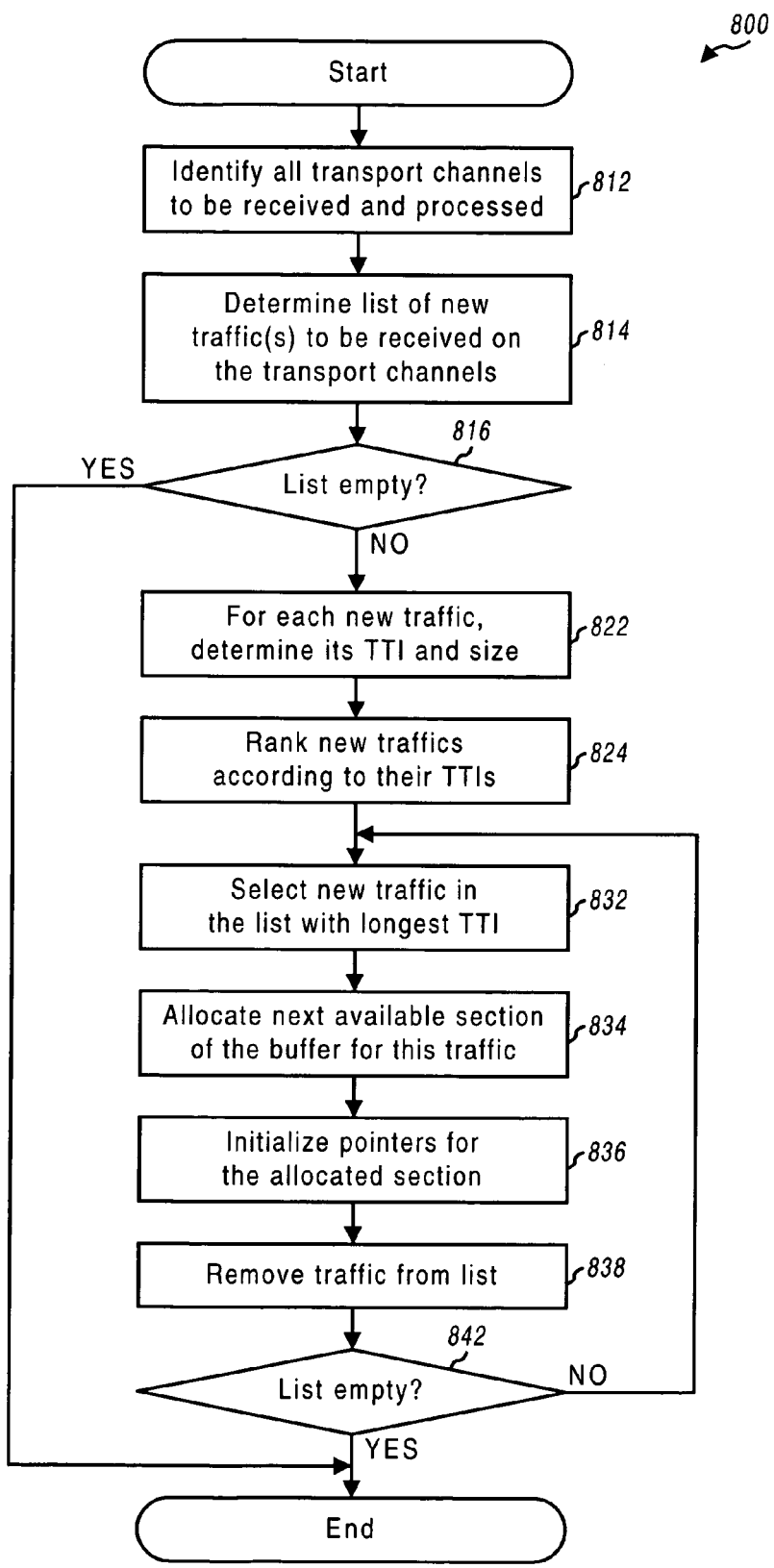
FIG. 8 is a flow diagram of a process to partition a buffer into a number of sections and to allocate the sections to multiple physical channels, in accordance with an embodiment of the invention.

FIG. 8 is a flow diagram of a process 800 to partition a buffer into a number of sections and to allocate the sections to transport channels, in accordance with an embodiment of the invention. Process 800 can be used for transport channels having time offsets that are less than the shortest TTI (e.g., transport channels associated with a particular CCTrCH). Process 800 can be executed at, or prior to, each radio frame boundary (i.e., prior to reception of the traffics on the transport channels).

Initially, at a particular designated time (e.g., prior to $t_1$, in FIG. 6), the transport channels to be received are identified, at step 812. New traffic(s) to be received on these transport channels are identified and placed in a list, at step 814. A determination is then made if the list is empty, at step 816. If the list is empty, indicating that no new traffics are to be received for the upcoming period and that re-partitioning of the buffer is not necessary, the process terminates.

Otherwise, if the list is not empty, the TTI and size of each new traffic to be received are determined, at step 822. The new traffics are then ranked according to their TTIs, at step 824. A traffic in the list that has the longest TTI is then selected, at step 832. A section of the buffer is defined and assigned to the selected traffic, at step 834. This section can be defined from a start location or the end of the previously allocated section. The section is also sized with sufficient capacity to store the entire traffic and (possibly) a portion of the next traffic to be received for the transport channel, as described above. The write and read pointers for the allocated section are then initialized (e.g., to the top of the allocated section), at step 836. The traffic is then removed from the list, at step 838.

A determination is again made whether the list is empty, at step 842. If the list is empty, indicating that all new traffics have been assigned to respective sections of the buffer, the process terminates. Otherwise, the process returns to step 832 and another traffic in the list that has the longest TTI is selected for assignment.

The process shown in FIG. 8 can also be use to partition and allocate the buffer for transport channels associated with multiple CCTrCHs. For multiple CCTrCHs, the allocation of the section in step 834 and the initialization of the pointers in step 836 can be achieved based on the particular CCTrCH being processed. Sections allocated to traffics in the first CCTrCH can be defined along a first direction of the buffer, and sections allocated to traffics in the second CCTrCH can be defined along a second direction of the buffer. The pointers for the sections assigned to traffics in the first CCTrCH can be initialized to the top of the sections, and the pointers for the sections assigned to traffics in the second CCTrCH can be initialized to the bottom of the sections.

Figure 9:
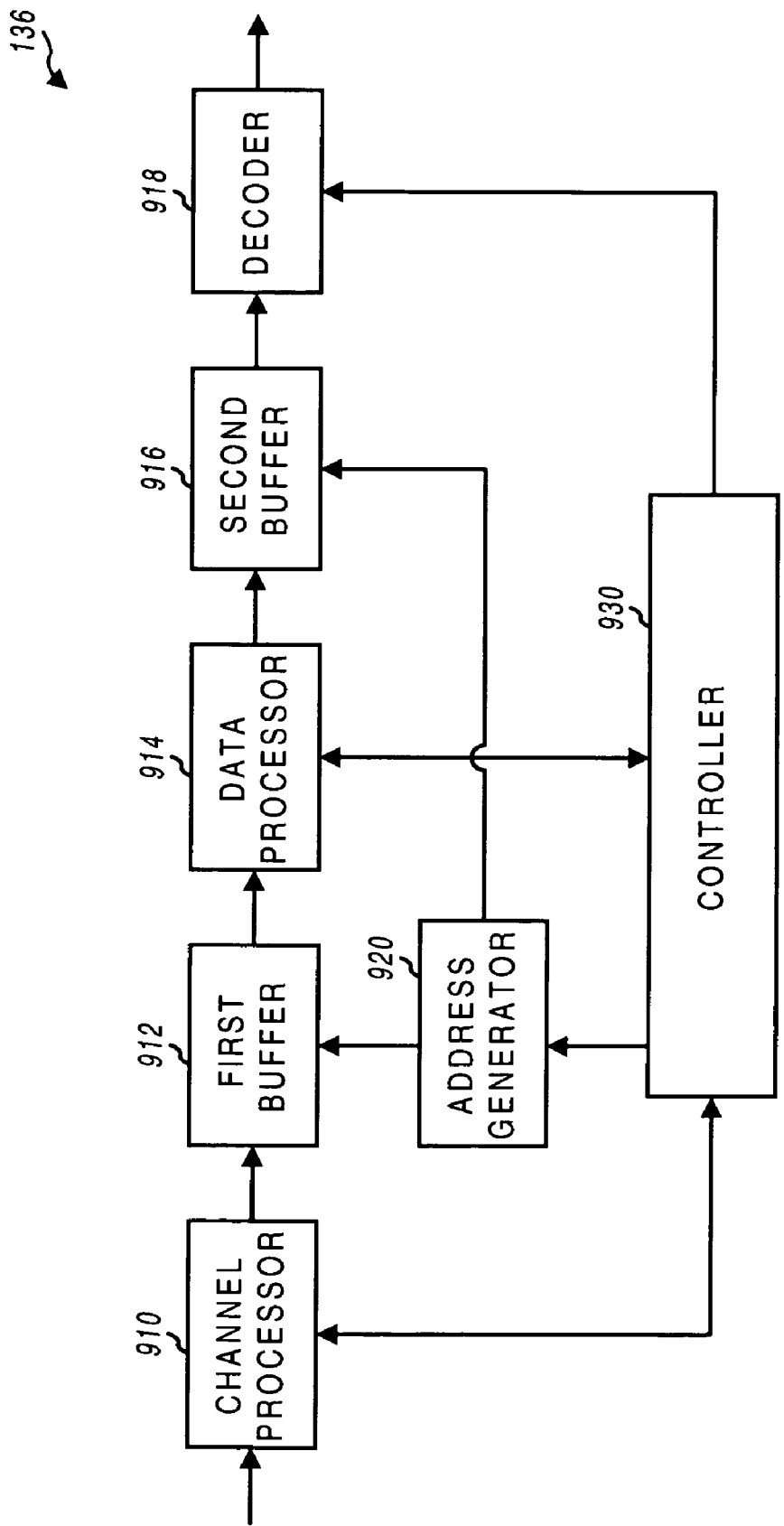
FIG. 9 is a simplified block diagram of an embodiment of a receive data processor, which is suitable for processing the downlink data transmission.

FIG. 9 is a simplified block diagram of an embodiment of receive data processor 136, which is suitable for processing a downlink data transmission in accordance with the W-CDMA standard. Receive data processor 136 can be used to perform some of the signal processing described above in FIG. 2B. The received signal is conditioned and digitized within receiver 134 to provide digitized samples. A channel processor 910 then receives and processes the samples to generate symbols for one or more physical channels. The processing typically includes despreading, decovering, and pilot demodulation, as described in U.S. patent application Ser. No. 09/655,609, entitled "METHOD AND APPARATUS FOR PROCESSING A PHYSICAL CHANNEL WITH PARTIAL TRANSPORT FORMAT INFORMATION," filed Sep. 6, 2000, U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS." These patents and patent application are assigned to the assignee of the present invention and incorporated herein by reference.

The symbols from channel processor 910 are stored to a first buffer 912, which can be implemented in the manner described above with regard to FIGS. 3 and 4. Buffer 912 can be operated to achieve (1) the second de-interleaving in block 252 of FIG. 2B (by writing the symbols to, or reading the symbols from, the buffer in a second permutated order) and (2) the physical channel concatenation in block 254 (e.g., by writing symbols for the physical channels in contiguous sections of the buffer). Symbols are then retrieved from buffer 912 and provided to a data processor 914.

Data processor 914 performs the inverse rate matching complementary to the rate matching performed in block 218. The symbols are then provided to a second buffer 916, which can be implemented in the manner described above with regard to FIGS. 6 through 8. Buffer 916 can be operated to achieve the first de-interleaving in block 264 of FIG. 2B (by writing the symbols to, or reading the symbols from, the buffer in a first permutated order). When all transport channel radio frames for a particular traffic have been received, a controller 930 can be signaled, which then schedules the subsequent processing (e.g., decoding) of the traffic.

Decoder 918 performs decoding in a manner complementary to the coding scheme used at the transmitter unit. Specifically, decoder 918 performs Viterbi decoding for convolutionally coded data, Turbo decoding for Turbo coded data, or no decoding or non-coded data. A CRC checker within decoder 918 typically further performs error detection based on the appended CRC bits. Decoder 918 then provides the decoded data to the data sink.

In an embodiment, buffers 912 and 916 are implemented in the manner described above. Specifically, buffer 912 can be partitioned and assigned to the physical channels based on the spreading factors and the sizes of the radio frames to be received on the physical channels. Buffer 916 can be partitioned and assigned to the transport channels based on the TTIs and the sizes of the traffics to be received on the transport channels.

Buffers 912 and 916 can each be implemented with various memory structures. For example, each (or both) of buffers 912 and 916 can be implemented using one or more memory units (e.g., buffers 912 and 916 can be implemented with a common memory unit), with a multi-port memory unit, with a memory unit that comprises of, or is partitioned into, a number of memory banks, or using other structures. Buffers 912 and 916 can be implemented with various memory technologies such as, for example, random access memory (RAM), dynamic RAM (DRAM), Flash memory, and others. Various structures and implementations of buffers 912 and 916 are possible and within the scope of the present invention.

As shown in FIG. 9, an address generator 920 is provided to operate buffers 912 and 916 and to maintain the write and read pointers for the sections of these buffers. Address generator 920 can be implemented as a separate unit, integrated within controller 930 or the buffers, or implemented within an ASIC that also includes the other processing elements.

In an embodiment, address generator 920 includes a data structure used to store information descriptive of the defined sections of each buffer. One entry in the data structure can be generated for each defined section. Each entry can include, for example, a start location and (possibly) an end location that define the section associated with the entry. Each entry may further identity the particular physical or transport channel to which the section is assigned. The data structure can further store information used to manage the operation of the assigned sections. Each entry can include, for example, the current values of the write and read pointers and the direction or scheme in which the pointers are to be updated. The data structure can further store other information that may be used to process the traffics within buffer 916. For example, the starting memory address of the next code block to be processed for each traffic can be stored.

The processing units described herein (e.g., the physical channel processor, data processor, decoder, controller, and others) can be implemented in various manners. For example, each of these processing units can be implemented in an application specific integrated circuit (ASIC), a digital signal processor, a microcontroller, a microprocessor, or other electronic circuits designed to perform the functions described herein. The processing units can also be integrated into one or more integrated circuits. Also, the processing units can be implemented with a general-purpose or specially designed processor operated to execute instruction codes that achieve the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A buffer structure for storing symbols received via a plurality of channels, wherein each channel is associated with a particular time interval over which the received symbols are subsequently processed, the buffer structure comprising:
    a buffer partitioned into a plurality of sections, one section for each channel, wherein the plurality of sections are assigned to the plurality of channels based on the associated time intervals; and
    an address generator coupled to the buffer and operative to provide addresses for writing symbols to the assigned sections;
    wherein the plurality of channels include a first group of one or more channels and a second group of one or more channels, wherein one or more sections assigned to the one or more channels in the first group are defined starting from a first initial location and continuing along a first direction of the buffer, and wherein one or more sections assigned to the one or more channels in the second group are defined starting from a second initial location and continuing along a second direction of the buffer.

2. A buffer structure for storing symbols received via a plurality of channels, wherein each channel is associated with a particular time interval over which the received symbols are subsequently processed, the buffer structure comprising:
    a buffer partitioned into a plurality of sections, one section for each channel, wherein the plurality of sections are assigned to the plurality of channels based on the associated time intervals; and
    an address generator coupled to the buffer and operative to provide addresses for writing symbols to the assigned sections;
    wherein the plurality of channels include a first group of one or more channels and a second group of one or more channels, wherein one or more sections assigned to the one or more channels in the first group are defined starting from a first initial location and continuing along a first direction of the buffer, and wherein one or more sections assigned to the one or more channels in the second group are defined starting from a second initial location and continuing along a second direction of the buffer;
    wherein the first and second initial locations are selected as a common location, and wherein the first and second directions are opposite directions.

3. A receiver unit operative to process symbols received via a plurality of channels in a communication system, wherein each channel is associated with a particular time interval over which the received symbols are subsequently processed, the receiver unit comprising:
    a channel processor operative to process samples received for the plurality of channels to provide symbols;
    a buffer coupled to the channel processor and operative to store the symbols from the channel processor, wherein the buffer is partitioned into a plurality of sections, one section for each channel, and wherein the plurality of sections are assigned to the plurality of channels based on the associated time intervals; and
    a data processor coupled to the buffer and operative to retrieve symbols for a particular traffic from an assigned section of the buffer and to process the retrieved symbols;

wherein the plurality of channels includes a first group of one or more channels and a second group of one or more channels, wherein one or more sections assigned to the one or more channels in the first group are defined starting from a first initial location and continuing along a first direction of the buffer, and wherein one or more sections assigned to the one or more channels in the second group are defined starting from a second initial location and continuing along a second direction of the buffer.

4. A method for storing symbols received via a plurality of channels, wherein each channel is associated with a particular time interval over which the received symbols are subsequently processed, the method comprising:
   identifying the plurality of channels to be received and processed;
   determining a time interval associated with each channel;
   assigning a plurality of sections of a buffer to the plurality of channels in accordance with the associated time intervals; and
   storing symbols received from the plurality of channels to the plurality of assigned sections;
   wherein the assigning includes
   ranking the plurality of channels according to the associated time intervals,
   selecting a channel associated with a longest time interval and not yet assigned a section of the buffer,
   allocating a next available section of the buffer to the selected channel, wherein the next available section is defined from a start location or an end of a preceding allocated section, and
   repeating the selecting and allocating for the plurality of channels.

5. A method for storing symbols received via a plurality of channels, wherein each channel is associated with a particular time interval over which the received symbols are subsequently processed, the method comprising:
   identifying the plurality of channels to be received and processed;
   determining a time interval associated with each channel;
   assigning a plurality of sections of a buffer to the plurality of channels in accordance with the associated time intervals; and
   storing symbols received from the plurality of channels to the plurality of assigned sections;
   wherein the assigning includes
   ranking the plurality of channels according to the associated time intervals,
   selecting a channel associated with a longest time interval and not yet assigned a section of the buffer,
   allocating a next available section of the buffer to the selected channel, wherein the next available section is defined from a start location or an end of a preceding allocated section, and
   repeating the selecting and allocating for the plurality of channels;
   wherein the assigning further includes
   determining the size of a traffic to be received on the selected channel, and
   wherein the next available section allocated to the selected channel is defined based on the determined traffic size.

6. A method for storing symbols received via a plurality of channels, wherein each channel is associated with a particular time interval over which the received symbols are subsequently processed, the method comprising:
   identifying the plurality of channels to be received and processed;
   determining a time interval associated with each channel;
   assigning a plurality of sections of a buffer to the plurality of channels in accordance with the associated time intervals; and
   storing symbols received from the plurality of channels to the plurality of assigned sections;
   further comprising:
   grouping the plurality of channels into a first group of one or more channels and a second group of one or more channels, and
   wherein the assigning includes
   first assigning one or more sections defined along a first direction of the buffer to the one or more channels in the first group in accordance with the associated time intervals, and
   second assigning one or more sections defined along a second direction of the buffer to the one or more channels in the second group in accordance with the associated time intervals.

7. A method for storing symbols received via a plurality of channels, wherein each channel is associated with a particular time interval over which the received symbols are subsequently processed, the method comprising:
   identifying the plurality of channels to be received and processed;
   determining a time interval associated with each channel;
   assigning a plurality of sections of a buffer to the plurality of channels in accordance with the associated time intervals; and
   storing symbols received from the plurality of channels to the plurality of assigned sections;
   further comprising:
   grouping the plurality of channels into a first group of one or more channels and a second group of one or more channels, and
   wherein the assigning includes
   first assigning one or more sections defined along a first direction of the buffer to the one or more channels in the first group in accordance with the associated time intervals, and
   second assigning one or more sections defined along a second direction of the buffer to the one or more channels in the second group in accordance with the associated time intervals;
   wherein the first and second groups of one or more channels are associated with first and second coded composite transport channels (CCTrCHs), respectively, defined by W-CDMA standard.

* * * * *